United States Patent
Bei et al.

(10) Patent No.: US 6,927,878 B2
(45) Date of Patent: Aug. 9, 2005

(54) METHOD FOR ELIMINATING MULTIPLE MODULATING AND DEMODULATING OF GROUP 3 FAX OVER PACKET AND LOW DATA RATE DIGITAL NETWORKS

(75) Inventors: JianWei Bei, Rockville, MD (US); Mehrdad Abrishami, Gaithersburg, MD (US); Richard Meyers, Montgomery Village, MD (US)

(73) Assignee: LSI Logic Corporation, Milpitas, CA (US)

( * ) Notice: Subject to any disclaimer, the term of this patent is extended or adjusted under 35 U.S.C. 154(b) by 1000 days.

(21) Appl. No.: 09/779,564

(22) Filed: Feb. 9, 2001

(65) Prior Publication Data

US 2003/0189720 A1 Oct. 9, 2003

Related U.S. Application Data

(60) Provisional application No. 60/182,110, filed on Feb. 11, 2000.

(51) Int. Cl.[7] ................................................. H04N 1/00
(52) U.S. Cl. .................. 358/402; 358/403; 358/426.01; 379/100.1; 379/100.17
(58) Field of Search ................................ 358/2.15, 402, 358/403, 405, 407, 426.02, 426.11, 468, 469; 379/100.01, 100.17, 100.09

(56) References Cited

U.S. PATENT DOCUMENTS

| | | | | |
|---|---|---|---|---|
| 5,491,565 A | * | 2/1996 | Naper | 358/468 |
| 6,463,135 B2 | * | 10/2002 | Abrishami et al. | 379/100.01 |
| 6,466,330 B1 | * | 10/2002 | Mori | 358/1.15 |
| 6,549,587 B1 | * | 4/2003 | Li | 375/326 |
| 6,650,440 B1 | * | 11/2003 | Wing | 358/402 |
| 6,674,541 B1 | * | 1/2004 | Kamiyama et al. | 358/1.15 |
| 2001/0046259 A1 | * | 11/2001 | Abrishami | 375/222 |
| 2003/0099338 A1 | * | 5/2003 | Bei et al. | 379/100.01 |

* cited by examiner

*Primary Examiner*—Kimberly Williams
*Assistant Examiner*—Negussie Worku
(74) *Attorney, Agent, or Firm*—Trexler, Bushnell, Giangiorgi, Blackstone & Marr, Ltd.

(57) ABSTRACT

A technique for detection and bypass of unnecessary modulation/demodulation and compression/decompression of Group 3 fax, in a telecommunication network having more than one pair, or "tandem," Group 3 fax relay gateways. Detection and the effective removal of a Group 3 fax tandem reduces end-to-end processing delays of the facsimile signal, and improves performance of the Group 3 fax communication. The invention uses frequencies normally used for voice information (such as V.21 channel 1 frequencies) to detect tandem fax relay gateways and effectively remove unnecessary relay gateways.

14 Claims, 3 Drawing Sheets

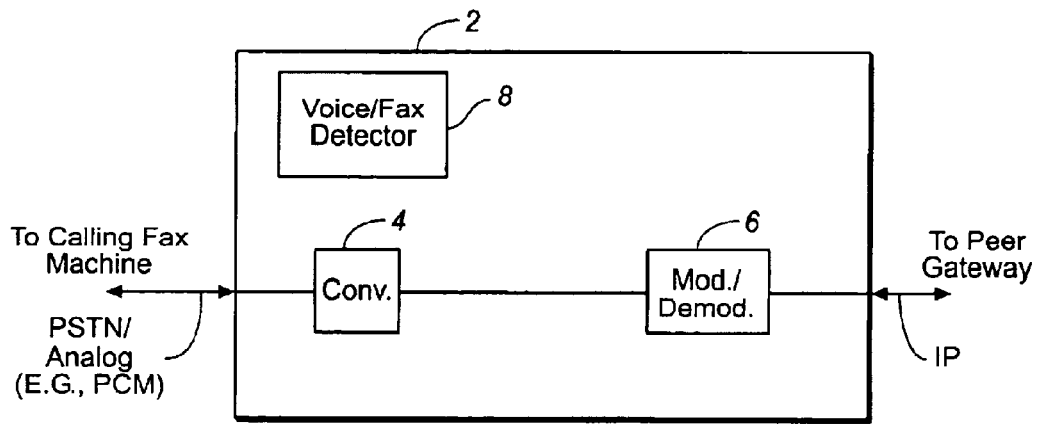
FIG._1
*(PRIOR ART)*
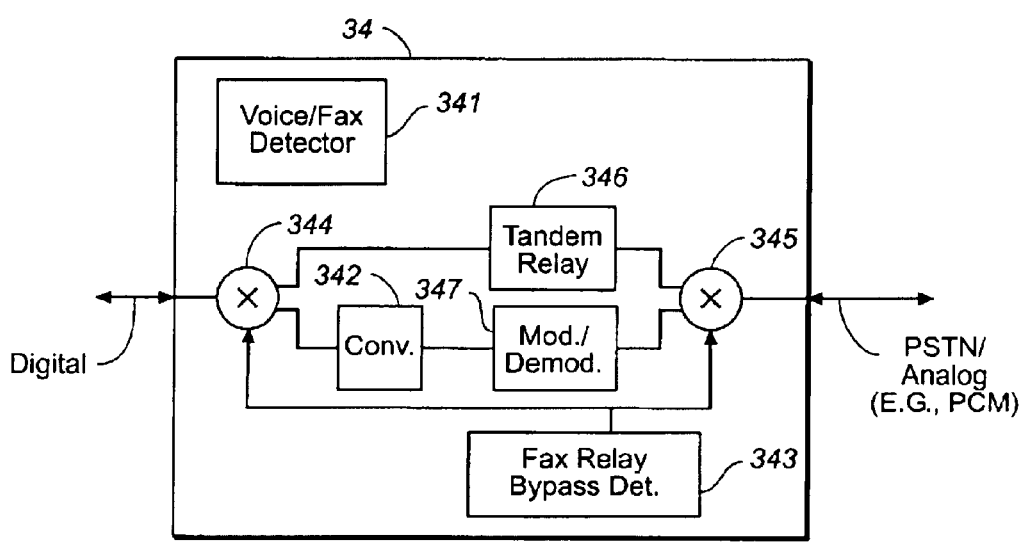
FIG._3

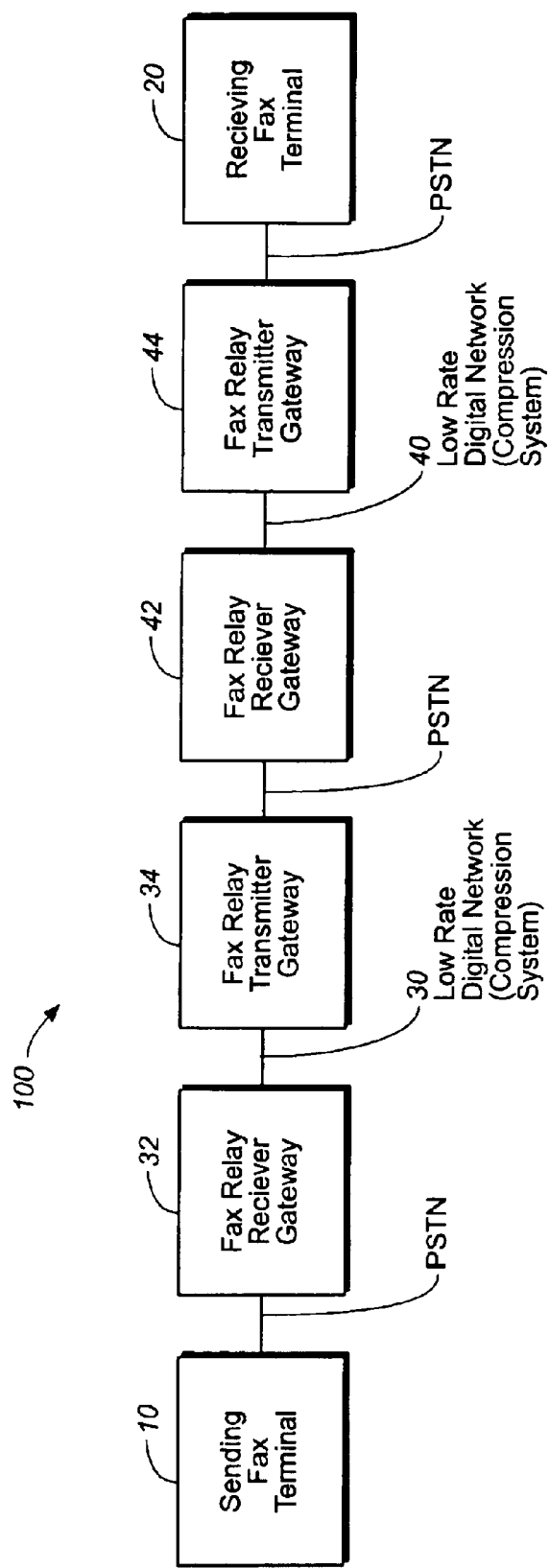
FIG._2

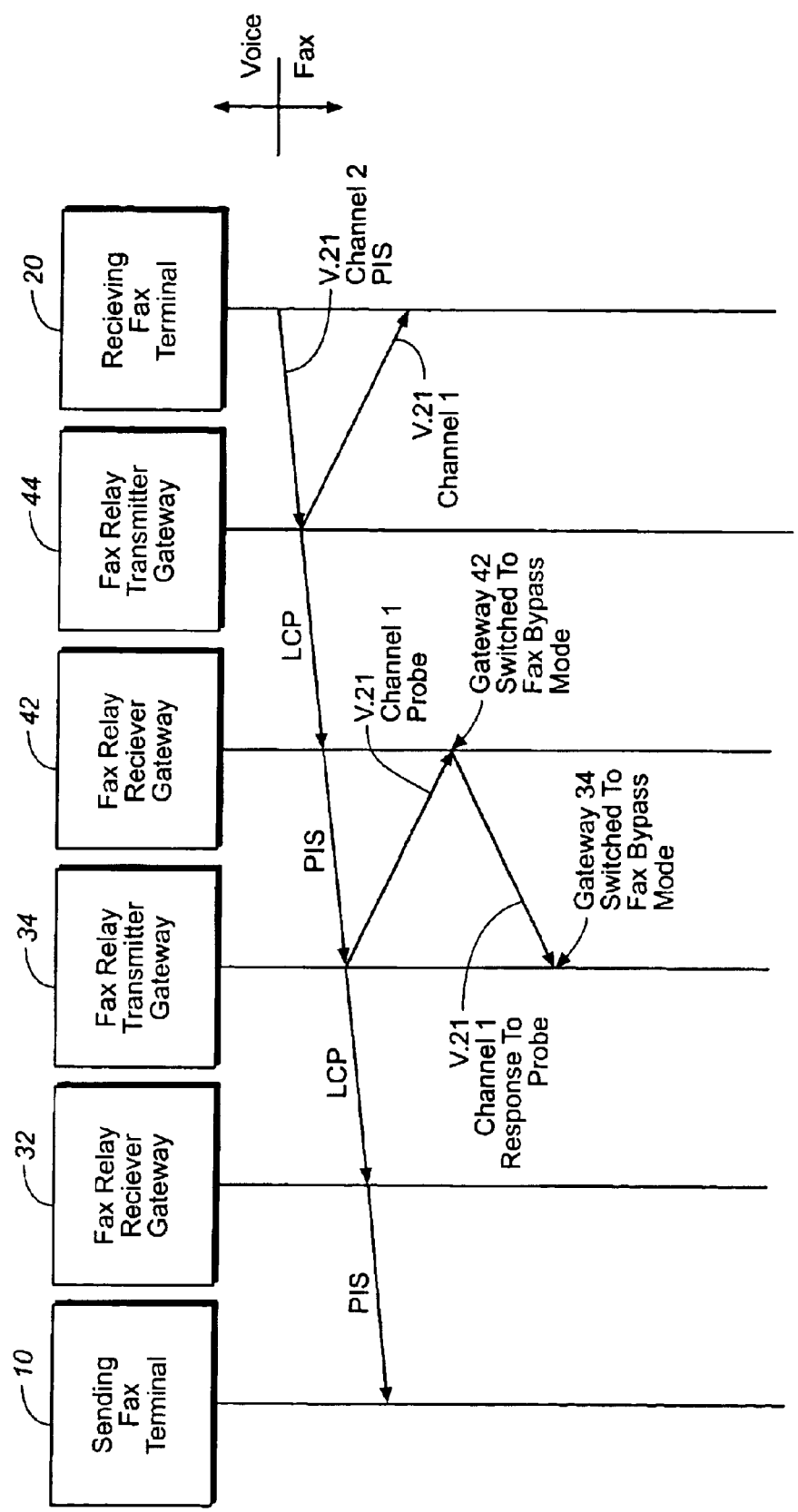
FIG._4

METHOD FOR ELIMINATING MULTIPLE MODULATING AND DEMODULATING OF GROUP 3 FAX OVER PACKET AND LOW DATA RATE DIGITAL NETWORKS

The present application is related to and claims priority to now abandoned U.S. Provisional application Ser. No. 60/182,110, filed Feb. 11, 2000. The contents of this provisional application are incorporated in their entirety herein by reference.

BACKGROUND OF THE INVENTION

This invention relates to facsimile communications with multiple pairs of gateways in the communication path. More particularly, the present invention relates to detection and avoidance of unnecessary encoding and decoding in relay connections.

In its T.30 and T.4 standards, the Telecommunications Standardization Section of the International Telecommunications Union (ITU-T) has defined procedures for facsimile transmission of documents in a public switched telephone network (PSTN). The T.30 and T.4 standards define a Group 3 facsimile service, also known as Group 3 fax and G3 fax. The entire contents of these standards are incorporated herein by reference. A Group 3 facsimile apparatus includes any one of (1) a facsimile machine, (2) a computer with a facsimile modem and corresponding software, and (3) other similar products.

Fax relay is used to allow Group 3 facsimile transmission between fax terminals where, in addition to the PSTN or ISDN (Integrated Services Digital Network), a portion of the transmission path utilizes low rate digital networks. Fax relay is a technique by which a fax terminal supporting traditional Group 3 facsimile procedures is connected to a gateway emitting a facsimile through a low rate digital network or a packet network to a receiving gateway, which in turn makes a PSTN call to the called Group 3 facsimile equipment. Once the PSTN calls are established on both ends, the two Group 3 terminals are virtually linked. All standard T.30 session establishment and capabilities negotiation is then carried out between the terminals.

SUMMARY OF THE INVENTION

As mentioned above, a network connecting two facsimile terminals may include low rate digital transmission, packet based communication paths, or synchronous TDM (time divisional multiplexing). Furthermore, a network may include multiple disconnected low rate digital sub-networks connected via PCM (Pulse Code Modulation). When using such networks, fax transmission is achieved via relay of Group 3 fax information, and there are multiple pairs of receiving and transmitting gateways.

Each gateway adds delays to the overall processing of the signaling between the two fax machines in real-time. When a network has two or three (or more) tandem fax relays, the delay associated with demodulation/re-modulation of the fax signal and the associated protocol can result in fax transmission failure due to timer violations specified in the T.30 protocol.

By detecting and effectively removing unnecessary fax relays (more specifically, removing unnecessary demodulation/re-modulation and/or compression/decompression), the invention eliminates processing delay associated with the fax relay gateways and thus improves the performance of the fax transmission.

BRIEF DESCRIPTION OF THE DRAWINGS

FIG. 1 depicts a conventional fax relay gateway.

FIG. 2 is a diagrammatical representation of a facsimile network including multiple pairs of fax relay gateways.

FIG. 3 depicts logical components of a fax relay gateway, according to the invention, which detects tandem fax relay gateways and implements fax relay bypass.

FIG. 4 is a timing ladder diagram illustrating the events that lead to detection of tandem fax relay gateways and fax relay bypass.

DETAILED DESCRIPTION OF PREFERRED EMBODIMENTS

The present invention avoids unnecessary fax relay tandem operation. When a calling Group 3 fax terminal is connected to a called Group 3 fax terminal, the called fax terminal starts by transmitting an answer tone. The called terminal, following the transmission of the answer tone, transmits a binary coded signal (BCS) indicating its identification and capabilities. The calling terminal responds by transmitting a binary coded signal corresponding to the calling terminal's capabilities. This handshaking, which corresponds to phase B (pre-message procedure) of the T.30 protocol, includes identification of capabilities and the commanding of chosen conditions as well as confirmation of acceptable conditions by the calling and the called fax terminals. The phase B (pre-message) procedure of the T.30 protocol is via V.21 channel 2. (Channel 2 is used for fax communications.) In addition, the phase B procedure is half-duplex.

In order to detect and effectively remove unnecessary fax relay tandem operations, the invention employs a unique digital pattern modulated using the V.21 channel 1 frequencies. (Channel 1 is typically used for data communications.) This pattern is transmitted for a duration sufficient enough to be detected with accuracy by any fax relay gateway in the direction toward the called or calling terminal. The V.21 channel 1 has higher and lower frequency characteristics defined as $F_A=1180$ Hz and $F_z=980$ Hz; where the higher characteristic frequency ($F_A$) corresponds to a binary 0 and the lower characteristic frequency ($F_z$) corresponds to a binary 1. The binary coded signalling (BCS) used by Group 3 fax machines and defined by ITU-T T.30 uses the V.21 channel 2. The V.21 channel 2 has higher and lower frequency characteristics defined as $F_A=1850$ Hz and $F_z=1650$ Hz; where the higher characteristic frequency ($F_A$) corresponds to a binary 0 and the lower characteristic frequency ($F_z$) corresponds to a binary 1.

Once unnecessary fax relay gateways have identified each other using the above detection mechanism, the relays are placed in fax bypass mode and start operating by relaying compressed data associated with the fax relay protocol within the pulse code modulation (PCM) stream.

In the bypass mode, the inner fax relay gateways are "disabled" for the period of the fax call. Only the gateway closest to each end user is enabled. In reality, a tandem network could typically use 2 to 3 levels of cascading. Since calls are setup with dynamic routing, fax bypass is enabled at the start of each call and is disabled at the end of the same call.

The invention will now be described in further detail.

FIG. 1 depicts a conventional fax relay gateway 2. FIG. 1 illustrates the functional components of a receiving or transmitting fax relay gateway 2 (a receiving fax relay gateway is the gateway closer to the sending fax machine and the transmitting fax relay gateway is the gateway closer to the receiving fax machine). Normally, fax relay allows Group 3 facsimile transmission between fax machines where in addition to the PST or ISDN, a portion of the transmission path used between machines includes a packet network, IP (internet), or a low rate digital network. In a normal fax relay gateway 2, a receiving gateway demodulates the T.30 transmission received from the calling fax machine. In more detail, the receiving relay gateway 2 accepts a PCM encoded stream from the calling fax machine, converts the PCM stream to linear samples in a converter 4 (by Alaw/ulaw to linear conversion), and performs demodulation of the facsimile signal in a modulator/demodulator 6. The demodulated T.30 facsimile control and image data is transferred in a message protocol stream structure to the peer gateway via a network. For example, Recommendation T.38 defines Internet Fax Protocol (IFP) packets, which are sent using a transport protocol (TCP or UDP) to the peer gateway. The peer gateway modulates the transferred information and establishes communication with the called facsimile machine using normal T.30 procedures. The peer, or transmitting, gateway forwards all relevant responses from the called fax machine to the receiving gateway. FIG. 1 also depicts a conventional voice/fax detector 8.

FIG. 2 illustrates fax transmission between a sending fax terminal 10 and a receiving fax terminal 20 via a network 100 having multiple pairs 32, 34 and 42, 44 of fax relay gateways. Each pair of gateways 32, 34 (or 42, 44) are linked by a low rate digital network 30 (or 40), which communicates the data in digital form. Terminal 10 is connected to gateway 32 by, for example, a PSTN (analog). Gateways 34 and 42 are connected by, for example, a PSTN (analog). Gateway 44 and receiver terminal 20 are connected by, for example, a PSTN (analog). Conventionally, gateway 32 (and 42) also compresses the digital signal and gateway 34 (and 44) decompresses the digital signal. Compressing and decompressing techniques are well known.

In the present invention, unnecessary analog/digital conversion (that is, modulation/demodulation) and unnecessary compression and decompression are eliminated to reduce delay and improve performance. In this embodiment (as will be described below), the modulation and decompression in gateway 34 is eliminated and the demodulation and compression in gateway 42 is eliminated.

FIG. 3 depicts a fax relay gateway (for example gateway 34) which detects and avoids unnecessary modulation/demodulation and compression/decompression. The gateway includes a voice/fax detector 341, a converter 342, a fax relay bypass detector 343, two signal and data routing switches 344 and 345, a tandem relay module 346, and a modulator/demodulator module 347.

The overall operation of gateway 34 will now be described. When the switches 344 and 345 are lined up to direct the processing to converter 342 and modulator/demodulator 347, the gateway operates in the conventional manner (similar to converter 4 and modulator/demodulator 6 of FIG. 1). When multiple pairs of relays are detected by the fax relay bypass detector 343, the gateway 34 is placed in fax bypass mode and switches 344 and 345 switch the processing path from converter 342 and modulator/demodulator 347 to tandem relay module 346. Following the switchover, gateway 34 no longer performs Alaw/ulaw to linear conversion or modulation/demodulation of the fax signal (or facsimile state tracking). Instead, the gateway 34 simply passes the demodulated fax message and protocol information by encoding the information as part of the PCM stream. In other words, the demodulated fax data received over the compressed part of the network is no longer modulated toward the PCM port, but rather certain bits of the PCM stream are used to send the demodulated fax data toward the PCM port.

When the fax is transmitted using the V.17, V.29 or V.27 modulation schemes, the compressed stream, data rate (demodulated fax data and protocol information) including message protocol overhead is less than 16 Kbps. For example, V.17 provides fax at 14,400 bps. Therefore, data from the compressed stream is at least ¼ the rate of the PCM stream. This means that by use of two bits within the PCM stream, the relay (in fax bypass mode) can transmit the compressed stream over the PCM stream. Since the PCM stream has a higher rate of transmission, this allows duplication of data for error correction and error recovery.

From the PCM port toward the digital (compressed) port (right to left in FIG. 3), the tandem relay module 346 extracts the data bits from the PCM stream and reformats the data into the compressed data stream format (such as the IFP packet format defined in Recommendation T.38).

The invention starts by detection of a facsimile transmission (in detector 341) followed by the detection of unnecessary pair(s) of fax relay gateways in the end-to-end call path (in detector 343). Then, the invention employs the data routing technique (in module 346) that provides for the demodulated (i.e., digital) facsimile and T.30 protocol data to be routed within the analog PCM stream, while bypassing fax relay gateway demodulation/re-modulation of facsimile signals (normally performed in module 347).

The voice/fax detector 341 is responsible to detect the start of a facsimile call and perform a logical switchover to process the PCM signal as a facsimile signal instead of a voice signal. The method to detect the presence of facsimile information is well known, and will be briefly summarized.

At the start of a fax call, the answering fax terminal starts by transmitting an answer tone according to ITU-T Recommendation V.25. The answer tone is referred to as CED (called terminal identification), and corresponds to a 2100 Hz tone, which is detected by the receiving fax relay gateway. The 2100 Hz tone is relayed to the sending fax relay gateway via a line control packet (LCP), which is a unique pattern, differentiated from an encoded voice packet. The CED tone is regenerated by the sending fax relay gateway upon detection of the CED LCP within a compressed stream.

Following the transmission of the CED, the receiving Group 3 fax terminal transmits the receiving fax terminal capabilities using binary coded signaling (BCS) described in ITU-T Recommendation T.30. HDLC (high level data link control) flags (0×7 E) in this BCS signal identifies the call as a facsimile transmission to a relay gateway. A receiving fax relay gateway then switches logically to process fax information and informs the sending fax relay gateway using a flag LCP to also switch the sending fax relay gateway to processing the fax signal.

FIG. 4 illustrates the signaling used in a preferred embodiment of the present invention in a network such as one shown in FIG. 2. This processing takes place after the conventional processing described above. In the present invention, after the receiving fax terminal 20 sends out the HDLC flags, the terminal 20 sends out a DIS (digital identification signal) signal using V.21 channel 2. Upon detection of preamble flags of this DIS signal, the fax relay transmitter gateway closest to the called terminal (gateway 44) transmits a unique digital pattern modulated using V.21 channel 1 frequencies. This pattern is transmitted for a duration sufficient enough to be detected with accuracy by any fax relay gateway in the direction toward the called terminal. In the preferred embodiment, the pattern includes two start flags of 0×11 followed by eight data bits which can be encoded to pass information from one gateway to another. The information may include the rate of transmission supported by the digital network. Following the data bits, there is a single terminating flag designated as 0×55.

As described above, the V.21 channel 1 has higher and lower frequency characteristics defined as $F_A$=1180 Hz and $F_z$=980 Hz; where the higher characteristic frequency ($F_A$) corresponds to a binary 0 and the lower characteristic frequency ($F_z$) corresponds to a binary 1. The binary coded signalling (BCS) used by Group 3 fax machines and defined by the ITU-T T.30 standard uses V.21 channel 2. The V.21 channel 2 has higher and lower frequency characteristics defined as $F_A$=1850 Hz and $F_z$=1650 Hz; where the higher characteristic frequency ($F_A$) corresponds to a binary 0 and the lower characteristic frequency ($F_z$) corresponds to a binary 1.

As shown in FIG. 4, the V.21 channel 2 DIS signal (described above) is converted to a line control packet (LCP) in fax relay transmitter gateway 44, and is then changed to a DIS signal in fax relay receiver gateway 42. Upon receipt of this DIS signal in fax relay transmitter gateway 34, gateway 34 issues the unique digital pattern (modulated using the V.21 channel 1 frequencies) in the direction toward the called terminal 20. This unique digital pattern is received by fax relay receiver gateway 42 and places gateway 42 in fax relay bypass mode. Gateway 42, in turn, sends a V.21 channel 1 response which places gateway 34 in fax relay bypass mode.

Following the switchover to the fax relay bypass mode of operation, a fax relay gateway (such as the gateway shown in FIG. 3) receives and transmits demodulated (digital) fax data as well as protocol information toward the PCM network, by inserting the data within the PCM stream.

Relay of such digital data in the fax bypass mode will now be described in further detail. Following the switchover to the fax relay bypass mode of operation, a fax relay gateway receives and transmits demodulated fax data as well as protocol information toward the PCM network, by inserting the data within the PCM stream. The PCM signal, defined in ITU-T Recommendation G.711, comprises logarithmically encoded values which comprise a plurality of bits which designate an order of magnitude and a plurality of bits which designate a mantissa. In the invention, the facsimile data is relayed within the PCM stream by routing the data between the second least significant and the second most significant bits of the 8-bit PCM stream. Each bit corresponds to 8 Kbps throughput, therefore to transmit fax at a maximum rate of 14.4K, only 2 bits is sufficient. However, additional bits can be used to provide error correction using various methods of Forward Error Correcting (FEC) and duplication to recover data loss attributed to existence of analog portions within the network between the inner gateways.

When transmitting digital data within the PCM stream, bit 0 is not used because T1 links use bit robbing of the bit 0 to pass signaling information. If the link is using E1 and this use is predetermined, then the least significant bit within the PCM stream can also be used.

This technique to bypass the fax relay gateways (except for the end point receiving and transmitting gateways 32 and 44) requires that network echo cancellers corresponding to the network segment which includes the inner (that is, bypassed) gateways, remain disabled during the fax transmission. An answering fax machine starts by transmitting a 2100 Hz tone. This may or may not include a phase reversal. If the answering tone does not have a phase reversal, the network echo cancellers will not disable. Therefore, the fax relay software monitors the presence of the 2100 Hz tone and regenerates this tone as a 2100 Hz tone with phase reversal every 450+/−50 ms to ensure that the network echo cancellers are disabled. Echo canceller disabling is further described in the ITU-T Recommendation V.25.

The receiving and transmitting gateways should ensure that the network echo cancellers remain disabled by transmitting filler or tone data during idle periods of the T.30 protocol to ensure that the echo cancellers are not re-enabled. Alternatively, the echo cancellers can be held disabled by use of selected bits within the PCM stream to transmit a tone within the PCM stream. The bits are determined to not interfere with the fax relay bypass process.

In order to ensure that the network between the inner gateways can transmit the facsimile relay information encoded within the PCM stream, a mechanism can be employed to verify the integrity of the link. If the bit error rate of transmitting digital information within the PCM stream is less than a pre-defined system dependent threshold, then the tandem bypass occurs, otherwise the inner gateways operate in their normal mode without switchover to the fax bypass mode.

After the switchover to the fax bypass operation, there may be a mechanism to determine the performance of the operation. One method of this determination is via the FEC added to the data that is transmitted over the PCM stream between the inner gateways. A mechanism may be provided to reinstate the normal (non-bypass) operation following the detection of a high bit error rate. In order to ensure that the system can return back to normal fax relay operation as a result of high bit error rate, the inner gateways keep track of the fax relay state transitions and operate as if there is no fax bypass mode. Therefore, the inner gateways can switch between the two modes of operation on demand and based on the network error rate between the inner gateways.

The invention is, of course, not limited to the embodiments described above. Modifications and variations within the spirit and scope of the invention will occur to those skilled in the field, in light of the above teachings. The invention is therefore defined by reference to the following claims.

What is claimed is:

1. A method of communicating a facsimile over a network having two endpoint fax relay gateways and at least two inner fax relay gateways, comprising:
   (a) identifying at least two inner fax relay gateways; and
   (b) placing the two inner fax relay gateways in a fax-bypass mode wherein the two inner fax relay gateways relay fax information without modulation and demodulation of the information.

2. A method as set forth in claim 1, wherein in step (a) voice channels are used to identify the inner fax relay gateways.

3. A method as set forth in claim 1, wherein in step (b) fax information is relayed by inserting digital information into a PCM (pulse code modulation) stream.

4. A method as set forth in claim 1, wherein step (b) includes monitoring an error rate of transmission of information in the PCM stream and placing the two inner fax relay gateways in a non-fax-bypass mode if the error rate is too high.

5. A network for communicating a facsimile, comprising:
   a plurality of fax relay gateways, wherein at least two of the fax relay gateways can be placed in a fax-bypass mode wherein the two fax relay gateways relay fax information without modulation and demodulation of the information.

6. A network as set forth in claim 5, wherein each of the two fax relay gateways include a fax relay bypass detector.

7. A network as set forth in claim 6, wherein the fax relay bypass detectors employ voice channels.

8. A network as set forth in claim 5, wherein at least one of the two fax relay gateways relays fax information by inserting digital information into a PCM (pulse code modulation) stream.

9. A network as set forth in claim 8, wherein the two fax relay gateways monitor an error rate of transmission of information in the PCM stream and place the two fax relay gateways in a non-fax-bypass mode if the error rate is too high.

10. A fax relay gateway comprising:

a relay path for a normal mode of relaying information wherein fax information is relayed with at least one of modulation and demodulation of the information; and a second relay path for a fax-bypass mode wherein the fax relay gateway relays fax information without modulation and demodulation of the information.

11. A fax relay gateway as set forth in claim 10, wherein the fax relay gateway includes a fax relay bypass detector.

12. A fax relay gateway as set forth in claim 11, wherein the fax relay bypass detector employs voice channels.

13. A fax relay gateway as set forth in claim 10, wherein the fax relay gateway relays fax information by inserting digital information into a PCM (pulse code modulation) stream.

14. A fax relay gateway as set forth in claim 13, wherein the fax relay gateway monitors an error rate of transmission of information in the PCM stream and places the fax relay gateway in the normal mode if the error rate is too high.

* * * * *